May 26, 1925.
S. KUCHARSKI
OPTICAL DEVICE FOR COMPENSATING THE MOVEMENT OF THE
FILM IN CINEMATOGRAPH APPARATUS
Filed Aug. 31, 1921
1,539,579
2 Sheets-Sheet 1
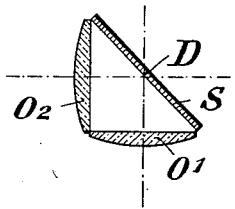
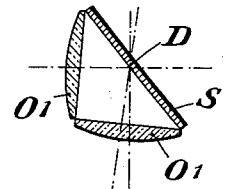
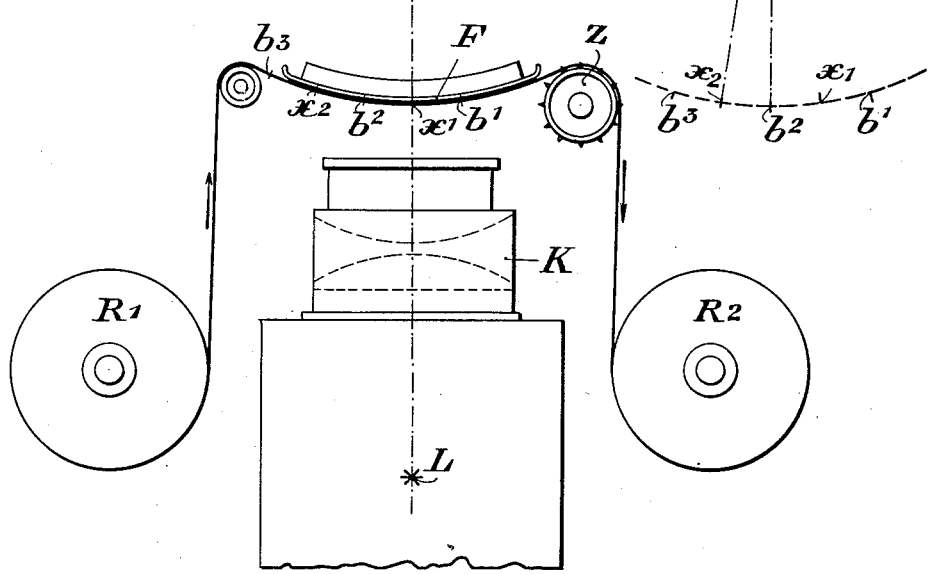
Fig.1.  Fig.2.
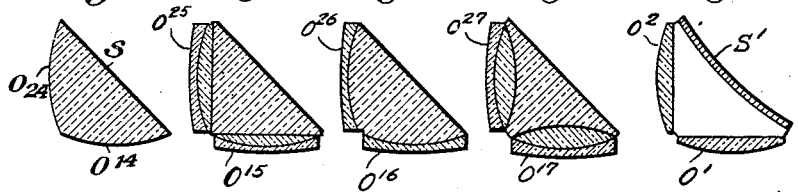
Fig.3.  Fig.4.  Fig.5.  Fig.6.  Fig.7.
INVENTOR
Stanislaus Kucharski
BY his ATTORNEYS
Pennie, Davis, Marvin and Edmonds

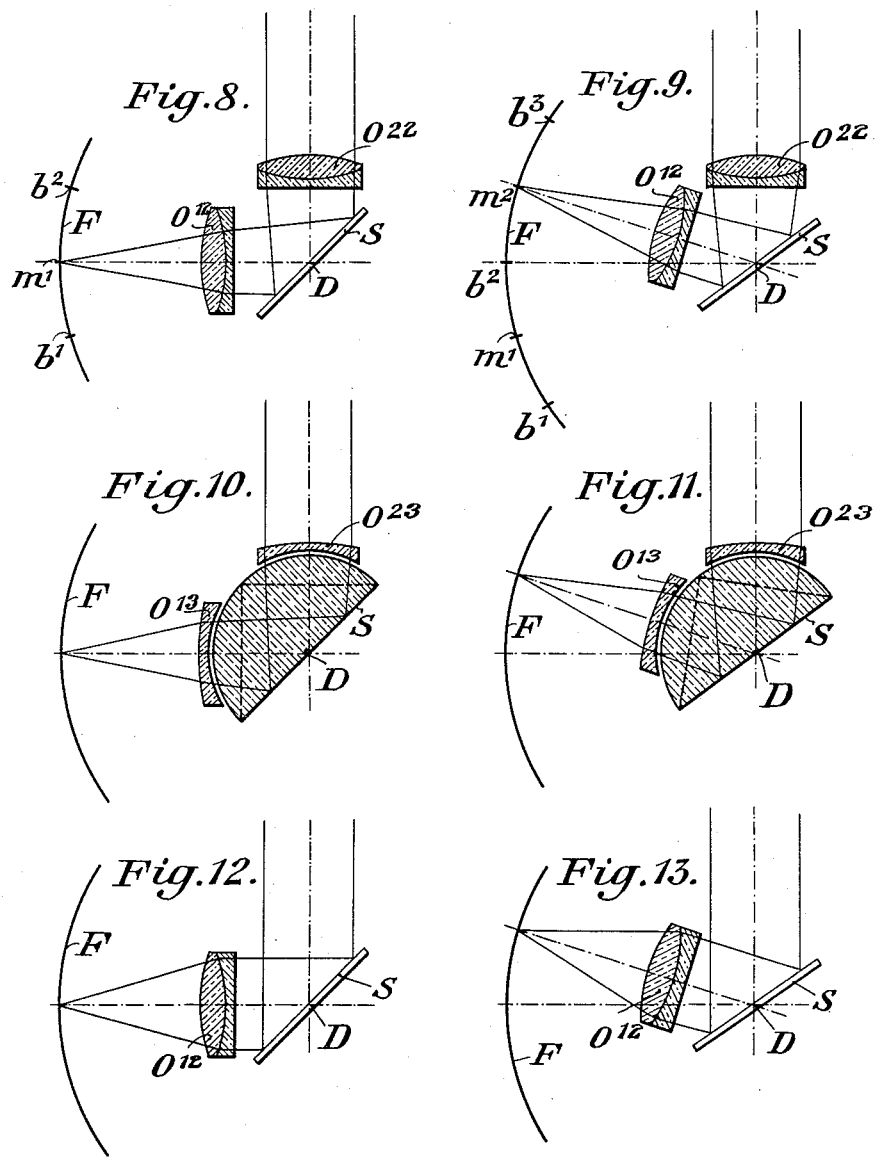

Patented May 26, 1925.

1,539,579

UNITED STATES PATENT OFFICE.

STANISLAUS KUCHARSKI, OF CHARLOTTENBURG, NEAR BERLIN, GERMANY, ASSIGNOR TO AUTOSCOPE LTD., OF LONDON E. C. 2, A BRITISH COMPANY.

OPTICAL DEVICE FOR COMPENSATING THE MOVEMENT OF THE FILM IN CINEMATOGRAPH APPARATUS.

Application filed August 31, 1921. Serial No. 497,305.

(GRANTED UNDER THE PROVISIONS OF THE ACT OF MARCH 3, 1921, 41 STAT. L., 1313.)

*To all whom it may concern:*

Be it known that I, STANISLAUS KUCHARSKI, engineer, a citizen of Germany, residing at Charlottenburg, near Berlin, Dernburgstrasse 45, Germany, have invented certain new and useful Improvements in Optical Devices for Compensating the Movement of the Film in Cinematograph Apparatus (for which I have filed applications in Germany, filed May 15, 1920; Great Britain, filed September 30, 1920; and Germany, filed May 15, 1920), of which the following is a specification.

The invention relates to devices for compensating the movement of the film in cinematograph apparatus by means of a mirror. The known arrangements require a considerable space because the mirror must be inserted in the path of the rays of light and the objective if it is arranged between the film and mirror must embrace a field of view of the image corresponding to two separate images, which requires a long focal distance.

According to the invention, the space required is lessened by combining together the mirror and the objective into a single member. The mirror and the objective are either combined into a movable prism in which one surface forms the mirror and one or more of the remaining surfaces the lenses of the objective, or the mirror and the two part objective are united together to form a prismatic objective, but are relatively movable in a predetermined manner.

An example of a construction according to the invention is shown diagrammatically in Fig. 1 of the accompanying drawing.

Fig. 2 shows the prismatic mirror after it has moved through a certain angle and the course of the rays of light when the film has been somewhat displaced.

Figs. 3–7 show different methods of constructing the prismatic mirror.

Figs. 8 to 11, inclusive, show forms of the invention, in which the mirror and two part objective are relatively movable.

Figs. 12 and 13 show a modified form in which a mirror and single objective are employed.

In Fig. 1, L is the source of light in front of which is the condenser K. The film is moved continuously in front of the condenser through the window F which in this case is curved. Opposite to the windows is the prismatic mirror which comprises the mirror S and the two lenses $O^1$ and $O^2$ which together form the objective. The mirror and the lenses are combined in a casing which can be rotated about an axis passing through the point D.

The film is moved uniformly, not step by step, by a roller $R^1$ past the window F over a toothed roller Z to a roller $R^2$.

In Fig. 1 it is assumed that a single image is in front of the window limited by the points $b^1$ and $b^2$. The image of the middle point $x^1$ of this image is thrown through the lens $O^1$ onto the centre of the mirror S and is thence reflected laterally through the lens $O^2$ to the screen. In the same way the other points of the image are thrown on the screen.

In order to compensate optically for the movement of the film the prismatic mirror is oscillated in known manner for this purpose about the axis D. In Fig. 2 it is assumed that the film has been moved on so that the point $b^2$ is in the optical axis of the apparatus. At this moment by means of an eccentric or other device, the prismatic mirror is rotated so that it is not the image of the point $b^2$ which is projected by the mirror S and the lenses on to the centre of the screen, but the middle point $x^2$ of the image $b^2$—$b^3$.

The prismatic mirror may, as shown in Fig. 3, be formed in a single piece, of which the plane surface S forms the mirror and the curved surfaces $o^{14}$, $o^{24}$ the objective.

In Fig. 4 the prism has three plane surfaces. The perpendicular surfaces are, however, converted into an objective by cementing to them one or more lenses $O^{15}$, $O^{25}$. An achromatic combination is shown in Fig. 4 of an objective consisting of a pair of planoconvex and concavo-convex lenses $O^{16}$, $O^{26}$. The prism may be of the same glass as the plano-convex lenses, which can be made of one piece with the prism, so that only the concavo-convex lenses need be cemented. By the construction of the lenses $O^{17}$, $O^{27}$ according to Fig. 6 a double anastigmatic lens is obtained.

Fig. 7 is similar to Fig. 1, but the mirror

S' is not plane but curved. It may in this case be either a concave mirror or a convex mirror, according to whether the construction of the lenses of the objective, which naturally also are made achromatic or anastigmatic, require a converging or a diverging lens between them.

In the inclined position of the mirror (Fig. 2) when the deviation is greatest, the optic axis of then lens $o^1$ falls on a point $x^2$ midway between $b^2$ and $b^3$. At this moment, however, the whole image $b^2$, $b^3$ should be embraced so that it is obvious that the field of view of the objective must be raised by half. If the three parts, the mirror and the two parts of the objective, were independent of one another, as shown in Figs. 8 and 9, the part $O^{12}$ might be moved through an angle corresponding to the image the mirror through half this angle, the part $O^{22}$ remaining stationary. In this device the rays of light, which cone from the middle point of the image which at that time is to be projected, coincide with the optic axes of both halves of the objective and no raising of the field of view occurs. The rotation of one half of the objective through the whole angle corresponding to the movement of the film and that of the mirror through half this angle offer no difficulty and can be attained in different ways; for example, obviously, by two eccentrics. The full movement of the objective $O^{12}$ may be effected by means of an eccentric and the half movement of the mirror by means of a system of parallel levers in connection with this part.

Figs. 10 and 11 represent the same method carried out with a prism. In these figures both surfaces of the prism are curved so that the middle points of the curves coincide with the rotary axis of the prism. Close to the curved surfaces of the prism but not cemented to them are the two diverging lenses $O^{12}$ and $O^{22}$ so arranged that as described in connection with Figs. 8 and 9 one of these ($O^{13}$) makes the full movement of the film and the other ($O^{23}$) is stationary. Since all points of the curved surfaces of the prism are at the same distance from the centre D, the movement of the prism relatively to the lenses $O^{13}$ and $O^{23}$ has no effect on the optical working of the device.

Figs. 12 and 13 represent the same method with the employment of the mirror and a single objective. In this case the objective is moved through the whole angle corresponding to the change of the film, the mirror through half the angle. If the objective is placed where the part $O^{22}$ is shown in Figs. 8-9, the objective remains stationary and only the mirror is moved.

I claim:

1. In a device of the type described, means for compensating the movement of the film, comprising a mirror for reflecting the light from the film, associated with an objective forming with said mirror a movable prism means for oscillating the prism in synchronism with the film-feeding means.

2. In a device of the type described, means for compensating the movement of the firm, comprising a mirror for reflecting the light from the film, and an objective disposed at an angle to said mirror, said means comprising a movably mounted unit means for oscillating the unit in synchronism with the film-feeding means.

3. In a device of the type described, means for compensating the movement of the film, comprising a mirror for reflecting the light from the film, in combination with an objective disposed to form with said mirror a movable prism, the lenses of said objective forming two sides of the prism and the mirror forming the remaining side means for oscillating the prism in synchronism with the film-feeding means.

4. In a device of the type described, the combination of a film guide with a movable prism for compensating the movement of the film, said prism comprising a lens disposed on one side thereof and forming the objective, and a mirror disposed on the other side thereof and means for oscillating the prism in synchronism with the film-feeding means.

5. In a device of the type described, the combination with a film guide, of means for compensating the movement of the film, said means comprising a mirror having a curved surface, combined with an objective to form a movable prism, said mirror forming one side thereof and the lenses of said objective forming the other side thereof.

6. In a device of the type described, the combination of a film guide with a means for compensating the movement of the film, said means comprising a mirror and an objective arranged in generally triangular form, said mirror and a part of said objective being movable and means for oscillating the mirror and objective in synchronism with the film-feeding means.

7. In a device of the class described, the combination of a film-guide with a device for compensating the movement of the film, said device comprising an integral prism having a reflecting surface and two surfaces curved so as to form a double objective and means for oscillating the prism in synchronism with the film-feeding means.

In testimony whereof I have affixed my signature in presence of two witnesses.

STANISLAUS KUCHARSKI.

Witnesses:
ALVIN HANSOMANNY,
GUSTAV PIETROH.